United States Patent Office 3,347,375
Patented Oct. 17, 1967

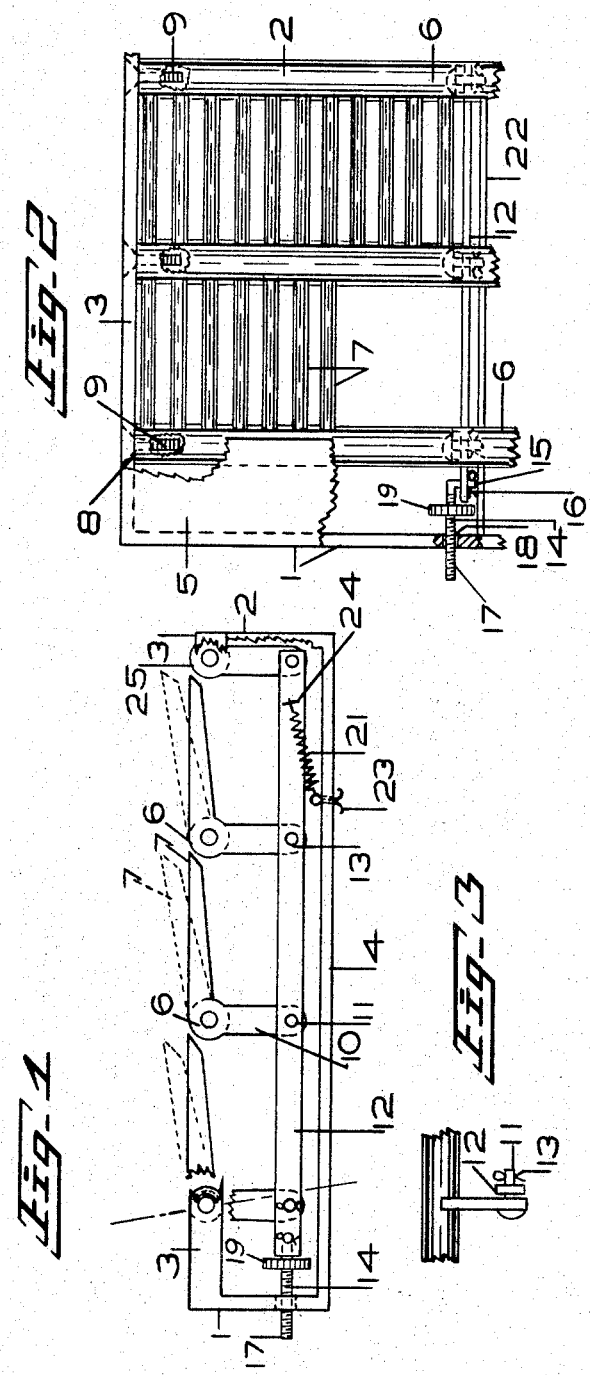

3,347,375
GRAIN SIEVE FOR COMBINE HARVESTERS
Walter David Hofer, Brocket, Alberta, Canada
Filed Apr. 30, 1964, Ser. No. 363,713
1 Claim. (Cl. 209—395)

This invention relates to grain sieves, having particular reference to a sieve for use in combines.

In the art to which the invention relates, sieves of this character are more usually formed with metal frames and have metal teeth attached to rods that are connected to be manually turned as a unit. In this the teeth have their base ends rolled over the rods, and in addition are flat, cutting down on the wind draft to an upper sieve, with the result that the chaff is not separated from the grain in the upper sieve when the lower sieve is closed to return unthrashed heads of grain from the cylinder.

In metal sieves of this character the metal frames may expand, tightening up against the combine walls, making it difficult to remove the sieves, and the teeth are inclined to crack and to open up where rolled over the cross rods on which the teeth are carried.

In the present invention it is proposed to make the sieves of a material having a rubber like resiliency, such as nylon, but strong enough to maintain their shape without distortion under normal pressures. The teeth are formed as a series of units each having a common tubular base and integral round teeth on the base.

There are further included integral arms on the teeth bases, one to each thereof, and these arms are connected to a bar that is mounted to be endwise movable in the sieve frame and by which the teeth sections may be moved as a unit for adjustment, and for removal of lodged material, and the units are removable from the sieve frame for replacement and repairs.

Other features and advantages of the invention will become apparent by reference to the accompanying description taken in conjunction with the drawings.

In the drawings, wherein is illustrated a preferred embodiment of the invention, FIG. 1 is a side view of a sieve embodying my improvements, shown with movement of the teeth units indicated by dashed lines, and with parts of the frame broken away.

FIG. 2 is an enlarged top plan view of the sieve, shown with parts omitted, and partly in section and broken away.

FIG. 3 is a side view showing a fragment of a section unit tubular base with adjusting arm and the actuating bar with the pin connecting the bar to the arm.

Having reference to the drawings there is shown a frame having front and rear walls 1 and 2, with upper side bars 3 and lower connecting bars, as at 4, and including a partial cover 5 at the front of the frame. In the side bars 3 are mounted the sieve units, each of which consists of a tubular base 6 with integral parallel teeth 7 spaced at uniform intervals, the teeth preferably having a diameter slightly less than the thickness of the grain kernal, and the spacing between the teeth approximating the diameter of the teeth. The tubular bases 6 have end inserts 8 on which the bases are free to turn, the inserts attaching by screws 9 to the upper side bars 3.

The tubular bases 6 have each an integral depending arm 10 centrally thereof, these arms attaching by pins 11 to an actuating bar 12 for the units, the pins having cotter pins 13 in the outer end portions. A link pin 14 has a bent end 15 engaging the actuating bar 12, the pin being held by a cotter pin 16 and having a threaded shank portion 17 free to slide in a complementary opening at 18 in the front frame bar 1, and has a knurled adjusting nut 19 on the shank inwardly of the frame bar 1 and by which the bar 12 may be moved endwise in the sieve frame and by its connections with the arms 10 turn the tubular bases 6 and raise the sieve teeth. The teeth are normally held with their outer ends resting against adjoining tubular bases 6 by a spring 21 anchored to the center frame bar 22 by a cotter pin 23, and engaging a hook 24 on the actuating bar 12, the rear set of teeth resting against an additional tubular base 25 at the rear of the sieve.

In the use of the sieve, the teeth are normally held as indicated by the full lines in FIGURE 1, or are movable by turning the nut 19 on the shank of the link pin 14, the nut bearing against the bar 1 to push forward on the adjusting bar 12 and correspondingly turn the tubular base bars 6 to raise the teeth, the teeth being drawn down to their normal position by the spring 21 by loosening the nut 19.

The frame and teeth units are preferably of resilient material, such that the frame may be distorted without injury when inserting or removing the frame from its housing in the combine, and to eliminate cracking or permanent bending of the teeth.

What I claim is:

A grain sieve comprising a resilient, self-supporting rectangular frame having a front wall, a rear wall, said wall having an opening therein, upper side bars, lower connecting bars and a center frame bar, a partial cover at the front of the frame, resilient, semirigid sieve units supported by the upper side bars, each sieve unit including a tubular base extending between the upper side bars with integral parallel teeth spaced at uniform intervals, inserts in the ends of the tubular bases attaching the bases to the upper side bars for pivotal movement, a further resilient, semirigid tubular base without teeth at the rear of the frame and similarly connected between the upper side bars as the sieve units and having an arm depending therefrom, arms depending from the tubular bases, an actuating bar disposed parallel to the lower connecting bars, pivot means for attaching the depending arms of the tubular sieve units and of the tubular toothless base to the actuating bar, a link pin having one end attached to the actuating bar, said link pin adapted to slide in the opening in the front frame wall, an adjusting nut on the shank portion of said link pin, and spring means attached at one end to the bottom actuating bar and its other end to the center frame bar for normally holding the free ends of the teeth on adjoining tubular bases, the free ends of the rear set of teeth resting against the tubular base at the rear wall of the frame whereby said frame and tubular based units being resilient may be distorted when inserting or removing the frame from its housing in the combine and will eliminate cracking and bending of the teeth.

References Cited

UNITED STATES PATENTS

| 925,623 | 6/1909 | Closz | 209—394 |
| 3,194,397 | 7/1965 | Taege | 209—394 |

FOREIGN PATENTS

| 706,374 | 3/1954 | Great Britain. |
| 1,037,988 | 9/1953 | France. |

HARRY B. THORNTON, *Primary Examiner.*

TIM R. MILES, *Examiner.*

L. H. EATHERTON, *Assistant Examiner.*